US007560021B2

(12) United States Patent
Marioni

(10) Patent No.: US 7,560,021 B2
(45) Date of Patent: Jul. 14, 2009

(54) SELECTOR VALVE OF A PRESSURE FILTER FOR AQUARIUMS OR PONDS

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 758 days.

(21) Appl. No.: 11/268,115

(22) Filed: Nov. 7, 2005

(65) Prior Publication Data

US 2006/0096900 A1 May 11, 2006

(30) Foreign Application Priority Data

Nov. 8, 2004 (EP) .................................. 04425830

(51) Int. Cl.
*B01D 35/147* (2006.01)
(52) U.S. Cl. .................. 210/106; 210/130; 210/167.21; 210/422; 210/424; 137/625.47; 137/614.17
(58) Field of Classification Search ................. 210/106, 210/130, 167.21, 340, 418, 422–427; 137/625.16, 137/625.47, 614.16, 614.17
See application file for complete search history.

(56) References Cited

U.S. PATENT DOCUMENTS 5,139,050 A * 8/1992 Otto ....................... 137/625.29

6,328,052 B1 * 12/2001 Loyning ......................... 137/1
2004/0197210 A1 10/2004 Lefebvre

FOREIGN PATENT DOCUMENTS

| DE | 33 22 068 A1 | 12/1984 |
| EP | 0 619 070 A2 | 10/1994 |
| EP | 1 068 888 A1 | 1/2001 |
| GB | 1 295 810 A1 | 11/1972 |
| WO | WO 01/27508 A1 | 4/2001 |

* cited by examiner

*Primary Examiner*—Terry K Cecil
(74) *Attorney, Agent, or Firm*—Akerman Senterfitt

(57) ABSTRACT

A selector valve of a pressure filter for aquariums or ponds comprises a valve body having a main liquid inlet opening (16), a secondary inlet opening (17), an outlet opening (18) and a discharge opening (19), a cursor (20) housed in the valve body (12), having a passage for the liquid (21) and being selectively moveable between a first position, corresponding to the filtration mode of the filter (11), wherein the main liquid inlet opening (16) is placed in fluid communication with the outlet opening (18), and a second position, corresponding to the washing mode, wherein the secondary inlet opening (17) is in fluid communication with the discharge opening (19), and a safety valve (36) included in the cursor (20) to protect the pressure filter in case of superpressure of the liquid.

22 Claims, 5 Drawing Sheets

SELECTOR VALVE OF A PRESSURE FILTER FOR AQUARIUMS OR PONDS

FIELD OF APPLICATION

The present invention refers, in general, to a selector valve of a pressure filter for aquariums or ponds.

The valve is intended to selectively direct, or distribute, a liquid subjected to filtration on the basis of a determined operating mode of the filter, like for example, in a normal filtering mode of the filter, to direct the liquid from the filter towards a delivery duct or, in a washing mode of the filter, to direct the liquid from the filter towards a discharge duct.

More particularly, the selector valve according to the invention is of the type comprising a valve body having a main liquid inlet opening, a secondary inlet opening, an outlet opening and a discharge opening, and a cursor housed in the valve body, having a passage for the liquid and being selectively movable between a first position, corresponding to the filtration mode of the filter, in which the main liquid inlet opening is placed in communication with the outlet opening, and a second position, corresponding to the washing mode of the filter, in which the secondary inlet opening is in communication with the discharge opening.

The present invention also refers to a filter having a selector valve of the aforementioned type.

PRIOR ART

In the field of filters for aquariums or ponds there is a well-known demand to have selector valves of liquid of the aforementioned type, which allow the path of the liquid downstream of a pressure filter to be alternatively deviated towards a delivery duct to reach the corresponding aquarium or pond, or else towards a discharge duct.

A known selector valve comprises a valve body having a main liquid inlet opening and a secondary opening intended to be placed in communication with the inside of the filter, an outlet opening and a discharge opening, which are intended to be respectively placed in communication with the delivery duct and with the discharge duct.

To direct the fluid towards the delivery duct or else towards the discharge duct, the selector valve also comprises a cursor housed in the valve body, which can be selectively moved between a first position, in which the liquid inlet opening is placed in communication with the outlet opening, and a second position, in which the secondary inlet opening is in communication with the discharge opening.

The selector valve can therefore take two positions according to the desired operating mode of the filter.

In the first position, corresponding to the normal filtration mode of the filter, the filtered liquid flows from the main inlet opening towards the outlet opening, whereas in the second position, normally corresponding to the washing mode of the pressure filter, the liquid coming from the pressure filter passes through the secondary inlet opening and is deviated towards the discharge.

Normally, the washing mode and the filtering mode involve two distinct hydraulic circuits of the liquid in the filter.

The known selector valve, whilst ensuring a selective conveyance of the liquid, nevertheless has a recognised drawback not yet overcome.

The main drawback lies in the fact that the known selector valve has a limited functionality and cannot be used to carry out other functions.

The technical problem underlying the present invention is therefore that of providing a selector valve of the above type that has greater functionality.

SUMMARY OF THE INVENTION

Such technical problem is solved by a selector valve of the aforementioned type that comprises a safety valve included in the cursor to protect the pressure filter in the case of overpressure of the liquid.

Further characteristics and advantages of the selector valve according to the invention shall become clearer from the description, made hereafter, of an embodiment thereof, provided for illustrating and not limiting purposes with reference to the attached drawings.

DETAILED DESCRIPTION

Figure 1:
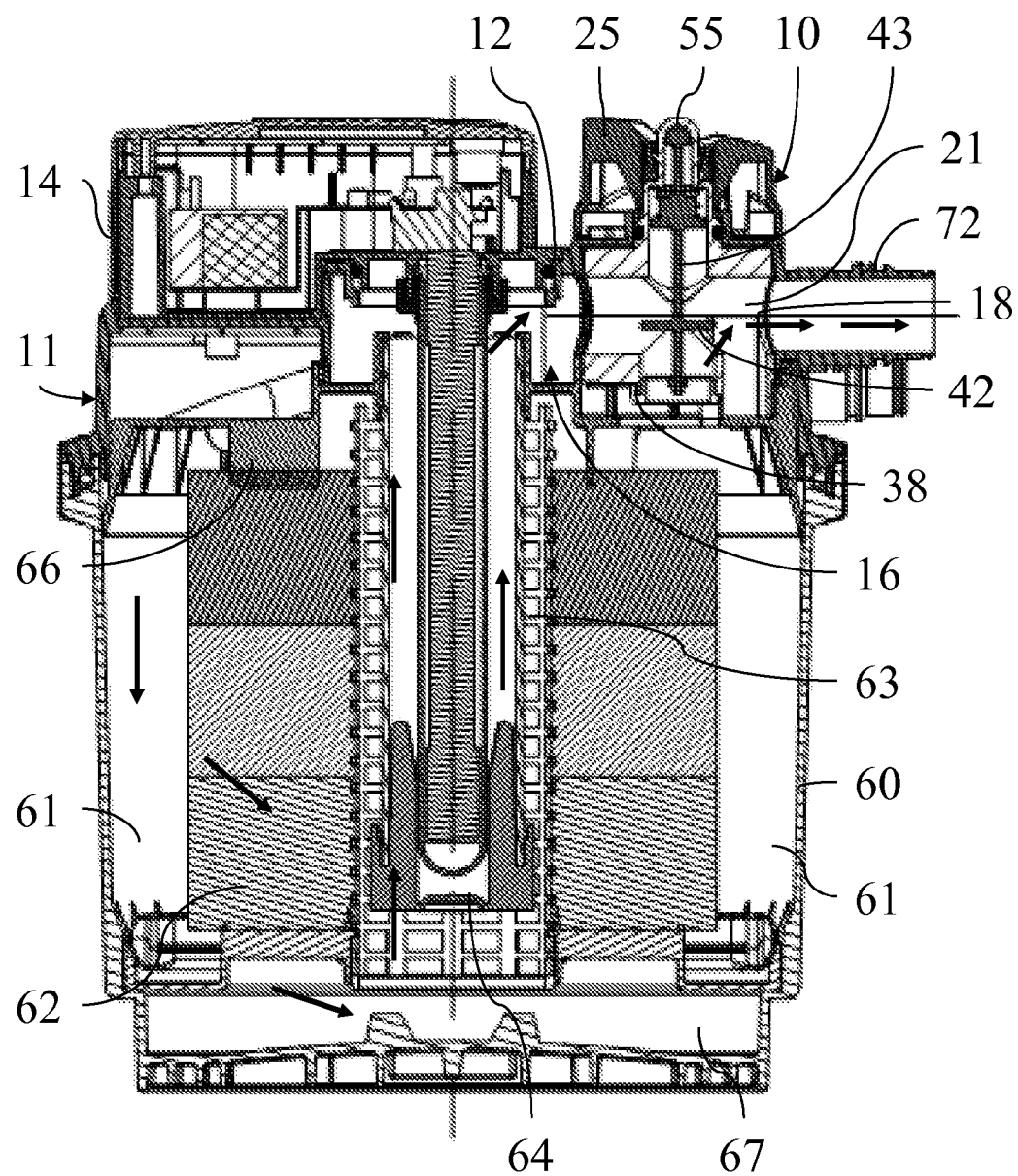
FIG. 1 illustrates a selector valve associated with a pressure filter for aquariums or ponds and arranged in a first position corresponding to the filtering mode.

With reference to the attached figures, a selector valve according to the present invention for a pressure filter 11 for aquariums and ponds is indicated, in general, with reference number 10.

The selector valve 10 comprises a valve body 12 which, in this specific case, is an integral part of a cover 14 of the pressure filter 11.

Figure 3:
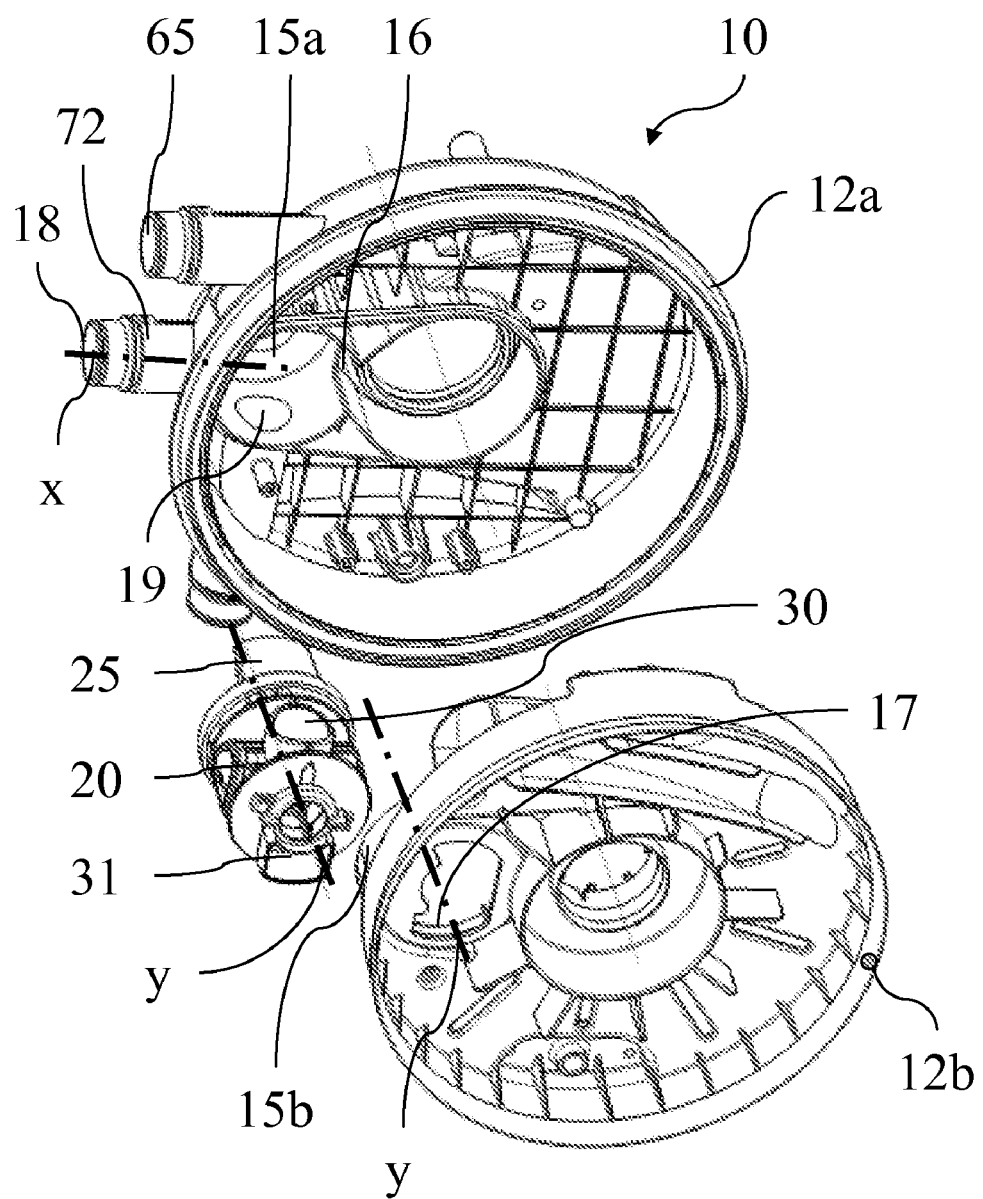
FIG. 3 shows an exploded view of the selector valve according to the invention.

In the specific case, the valve body 12 comprises two half-shells, an upper half-shell 12a and a lower half-shell 12b (FIG. 3), each of them comprising a half-seat 15a and 15b respectively, substantially cylindrical in shape.

The valve body 12 comprises a main liquid inlet opening 16, a secondary inlet opening 17, an outlet opening 18 and a discharge opening 19.

In the specific case, the main inlet opening 16, the outlet opening 18 and the discharge opening 19 are formed in the upper half-shell 12a and have axes all lying on a same main plane, for example the horizontal plane.

Moreover, as it can be seen from the drawings (FIG. 3), the main inlet opening 16 and the outlet opening 18 are aligned with each other along a determined major axis X, whereas the discharge opening 19 has an axis forming an angle of 90° with the other two.

The secondary inlet opening 17 is formed in the lower half-shell 12b and has an axis lying in a plane substantially perpendicular to the plane of the other three openings 16, 18, 19.

The selector valve 10 further comprises a cursor 20, also called male or distributor, substantially cylindrical in shape, which is inserted in the seat 15a, 15b of the valve body 12.

Figure 2:
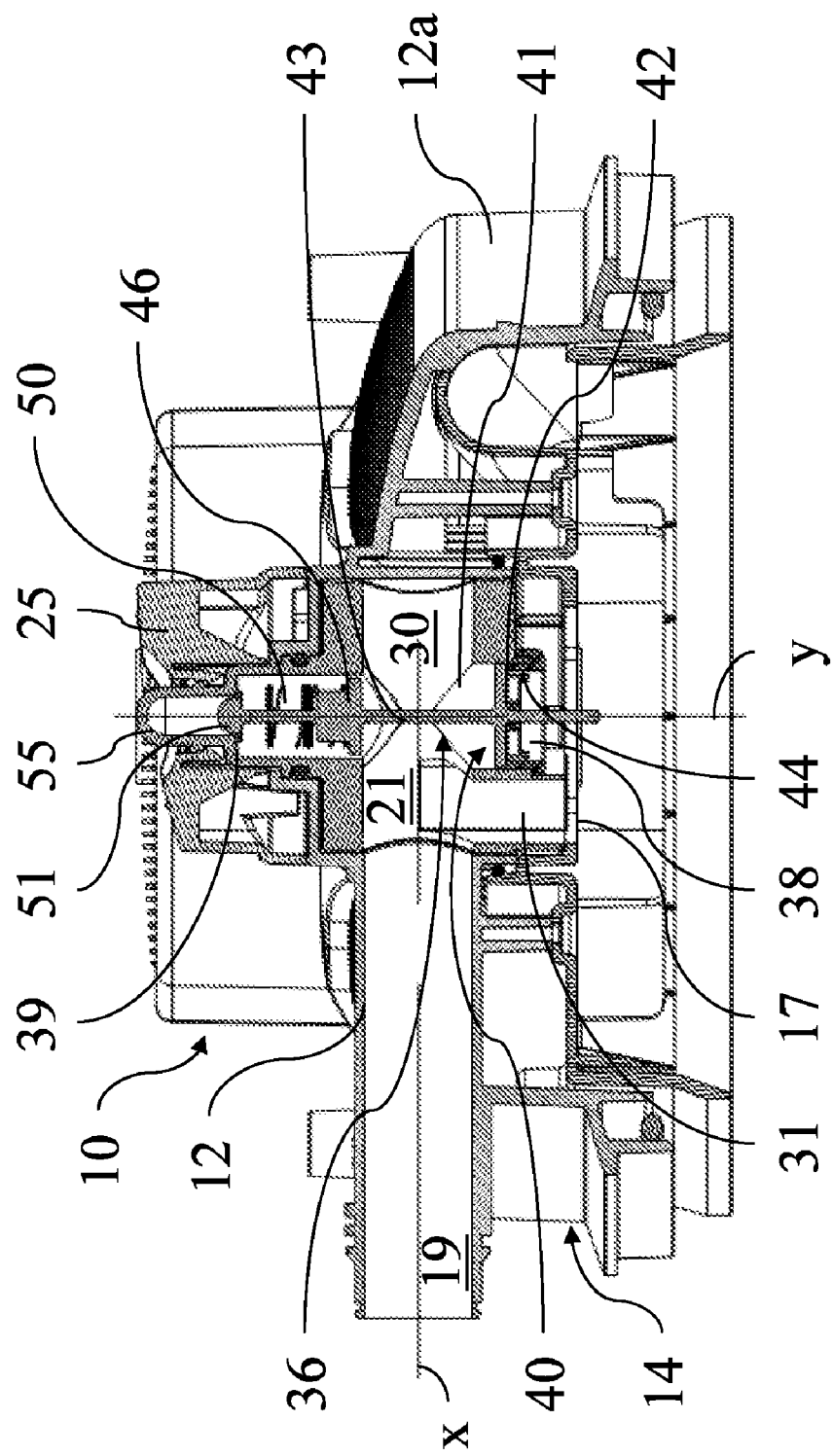
FIG. 2 illustrates a section of the selector valve in a second position corresponding to the washing mode.
Figure 5:
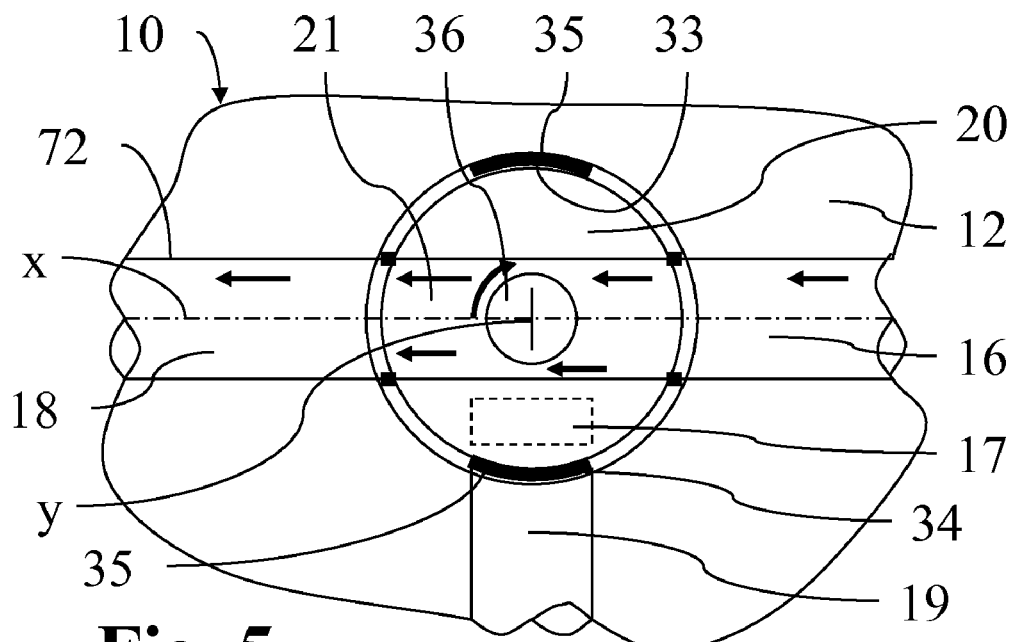
FIG. 5 schematically illustrates a plan of the valve of FIG. 1 in the first position corresponding to the filtering mode.
Figure 6:
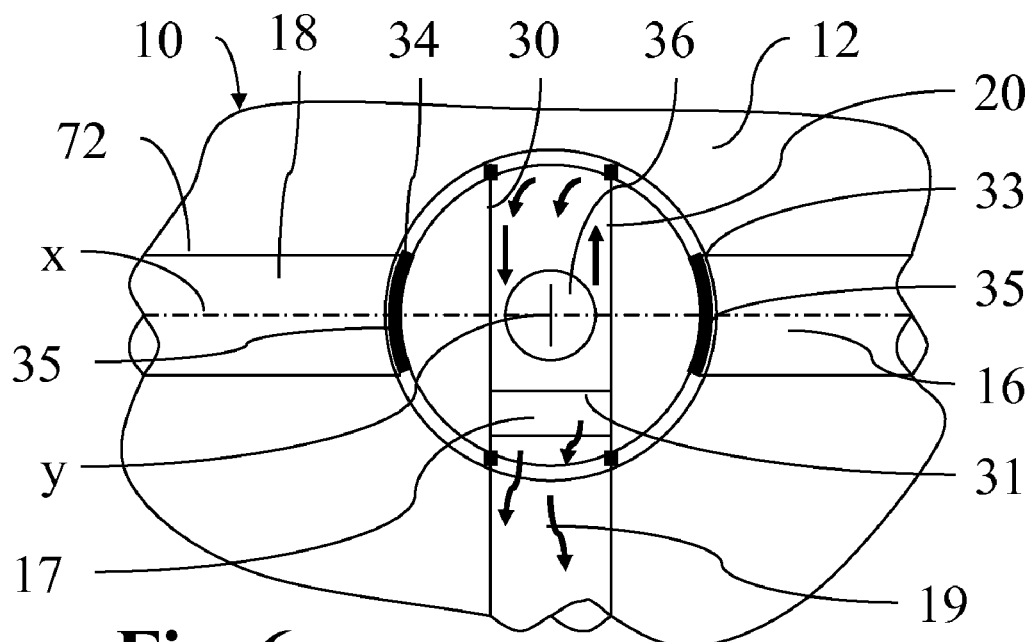
FIG. 6 schematically illustrates a plan of the valve of FIG. 2 in the second position corresponding to the washing mode.

The cursor 20 can be moved in the valve body 12 between a first position, corresponding to a filtration mode of the filter 11, in which the main inlet opening 16 is in communication with the outlet opening 18 (FIGS. 1 and 5), and a second position, corresponding to a washing mode of the filter 11, in which the secondary inlet opening 17 is in communication with the discharge opening 19 (FIGS. 2 and 6).

In the specific case, the cursor 20 can be moved angularly about a central axis Y perpendicular to the major axis X.

In order to make the rotation easier, the cursor 20 is associated with two disc-shaped elements 22 and 23 respectively, arranged perpendicularly to the axis Y, which are fixed integrally and on opposite sides with respect to the cursor 20.

To place the four openings 16, 17, 18, 19 in communication, a liquid passage 21 is formed in the cursor 20 (FIGS. 1, 2, 4, 5, 6).

In the specific case, the liquid passage 21 is substantially upside-down L-shaped (FIG. 2), and comprises a first branch 30 having its axis parallel with the major axis X and lying on the aforementioned main plane, and a second branch 31 arranged parallel to the central axis Y in eccentric position with respect to this latter.

It is to be noted that, on opposite sides with respect to the first branch 30 of the passage 21, the cursor 21 comprises a pair of seats 33 and 34 respectively, for housing two corresponding cap-shaped gaskets 35.

To manoeuvre the cursor 20, the valve 10 comprises a control cover 25, mounted coaxially on the first disc-shaped element 22.

More details on the operation of the selector valve 10 in association with the pressure filter 11 shall be described hereafter in the description.

According to the invention, the selector valve 10 comprises a safety valve 36 included in the cursor 20 to protect the pressure filter in the case of overpressure of the liquid.

In other words, according to the present invention, the cursor 20 of the selector valve 10 is integrated with a safety valve 36. By observing the drawings it is possible to see that the cursor 20 exactly acts as a valve body of the safety valve 36.

The safety valve 36 comprises a liquid path 41 extended in the cursor 20 between an inlet mouth 38 and an outlet mouth, in this case corresponding to the outlet opening 18, a shutter element 40, and a shutter seat 44 associated with the inlet mouth 38.

The inlet mouth 38 is preferably formed in the valve body 12.

Preferably, the shutter seat 44 and the shutter 40 are formed in a central position of the cursor 20, along the axis Y.

In this way, the liquid path 41 of the safety valve 36 is coaxial to the axis Y of angular displacement of the cursor 20 and comes out in the liquid passage 21.

Figure 4:
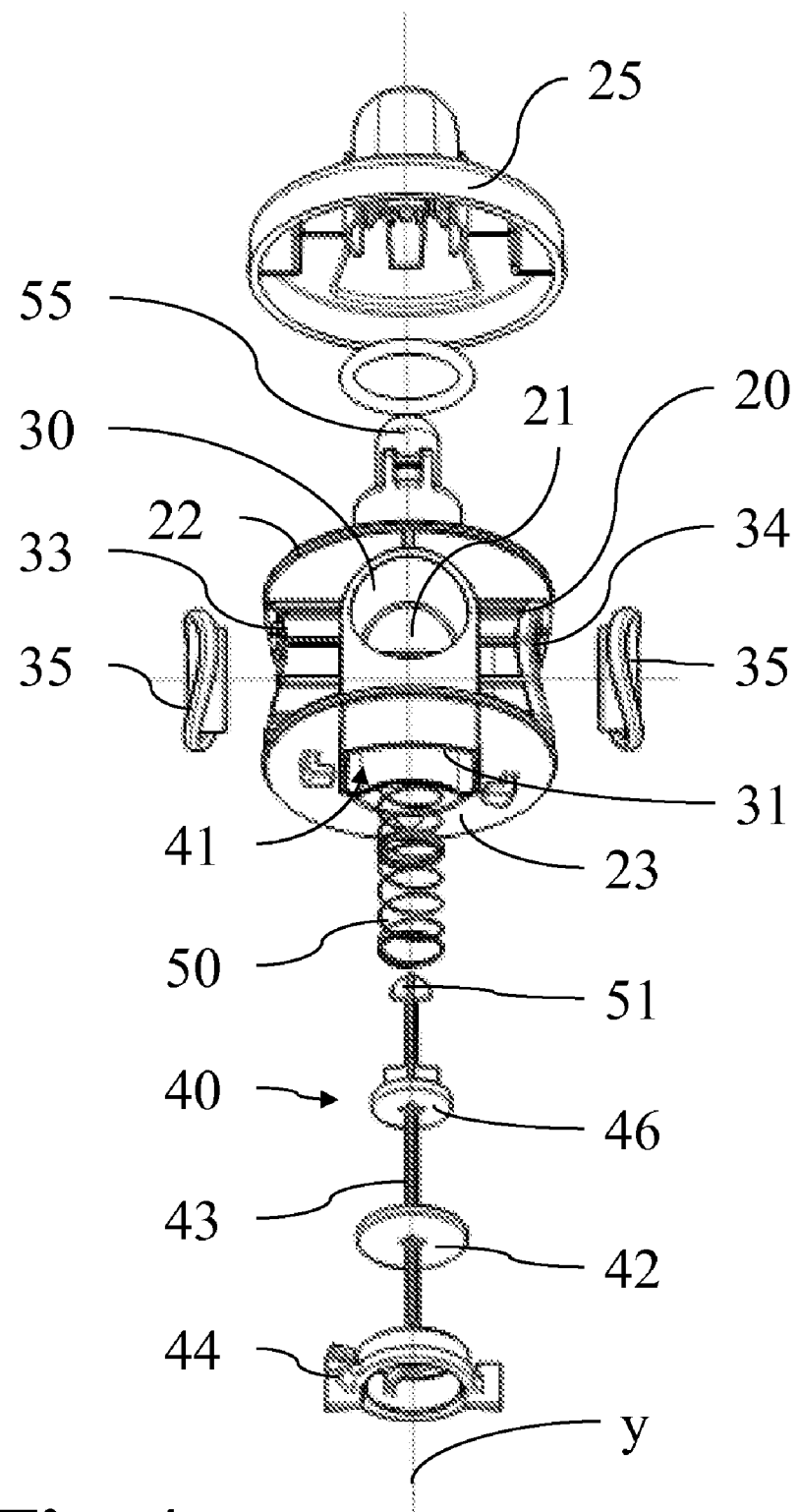
FIG. 4 illustrates an exploded view of the cursor of the selector valve according to the invention.

The shutter element 40, in the specific case, comprises, as main components, a disc 42 and a rod 43, having a first end integrally associated with the disc 42 (FIG. 4).

The shutter seat 44 comprises a ring, fixed to the lower disc 23 of the cursor 20, which acts as a stroke end element of the disc 42.

The safety valve 36 also comprises a spring 50 associated with the rod 43 and closed between a stop 46, integral with the rod 43, and a wall 39 opposite to the inlet mouth 38.

The spring 50 is selected so as to normally keep the disc 42 in shutting position in the shutter seat 44, and to be pressed against the wall 39 when the liquid inside the filter exceeds a predetermined threshold value determining a movement of the rod 43.

At a second end of the rod 43, the selector valve 10 comprises an index 51, formed in this specific case with a half-moon element.

To contain the index 51, the selector valve 10 preferably comprises a dome 55, or cupola, which emerges from the cursor 20 extending along the axis Y coaxial to the shutter element 40 and to the relative seat 44.

Preferably, the second end of the rod 43 and the index 51 are slidingly inserted in the dome 55.

The dome 55 is made of transparent material to allow the index 51 moved into the dome 55 itself to be seen from the outside.

The present invention also refers to a pressure filter comprising the selector valve 10.

In the case of the illustrated solution, the pressure filter 11 comprises a container 60, defining an inner chamber 61 where filtering elements 62 are housed, in the specific case sponges.

The filtering elements 62 are substantially arranged coaxially around a grated pipe 63 surrounding a duct 64.

In the specific case, the main inlet opening 16 of the selector valve 10 is placed in communication with the duct 64.

The operation of the selector valve 10 in association with the filter 11 shall now be illustrated.

During a normal operating mode of the pressure filter 11, called filtration mode, the liquid to be filtered, following a first circuit, enters under pressure through a supply duct 65 (FIG. 3), passes through an opening 66 and floods the inner chamber 61 of the container 60.

In so doing, the liquid crosses the sponges, reaches a bottom area 67 of the container 60, from which through the central duct 64 it reaches the main inlet opening 16.

In such filtration mode, the selector valve 10 is in the above described first position (FIGS. 1 and 5) in which the main inlet opening 16 is in communication with the outlet opening 18.

This allows the filtered liquid to be pushed under pressure towards a delivery duct 72 associated with the outlet opening 18.

In this condition, the inlet mouth 38 of the safety valve is blocked by the disc 42.

In the case in which the pressure of the liquid exceeds a predetermined limit value, such pressure overcomes the counter pressure of the spring 50 determining a movement, in the specific case a vertical movement, of the disc 42 towards the dome 55 (in FIG. 1 the disc 42 can be seen in moved position).

Further to the vertical movement, the inlet mouth 38 is opened and therefore the liquid can flow from the path 41 towards the main passage 21 and towards the outlet opening 18.

Thanks to the movement of the rod 43, the index 51 pokes into the dome 55 and and it can thus be seen from the outside to indicate that the pressure limit value has been exceeded.

When the pressure of the liquid falls below the limit value, the force of the spring 50 predominates on the disc 42, and this latter once again closes the hole 38, to allow the normal operation of the filter 10.

At a subsequent moment, when it is necessary to wash the filter, the selector valve 10 is positioned in the aforementioned second position (FIGS. 2 and 6).

The cursor 20 is angularly moved about the axis Y, preferably by 90°, so that the two gaskets 35 close the main inlet opening 16 and the outlet opening 18.

In this way, after the angular movement the secondary inlet opening 17 is in communication with the discharge opening 19.

The communication is obtained through alignment on the vertical plane of the second branch 31 of the liquid passage with the secondary inlet opening 17 (FIGS. 3 and 6) and alignment on the main horizontal plane of the first branch 30 of the passage with the discharge opening 19.

At the starting of the pump in the washing mode, the liquid following a second circuit inside the filter 11 thus enters through the supply duct 65 and floods the inner chamber 61.

The liquid reaches the top of the container 60 and enters into the secondary inlet opening 17 of the selector valve 10 to thus directly reach the discharge opening 19.

The main advantage of the present invention lies in the structural and constructive simplicity since the cursor of a selector valve is exploited as valve body for a safety valve.

A selector valve is thus obtained with a double functionality of actual selector valve and of safety valve.

Another advantage lies in that it is possible to integrate the selector valve and the safety valve in a single device so as to reduce to the minimum the number of used components to be associated with the filter.

Also the constructive provisions of the illustrated solution allow further advantages to be obtained.

For example, the arrangement of the safety valve in a central area of the cursor, and along the angular movement axis of this latter between one position and the other, allows the safety valve and the selector valve to operate independently from each other without causing a mutual interference.

The safety valve can be fitted both when the selector valve is in the first filtration mode position and when it is in the second washing mode position.

The central position of the safety valve also allows a very compact, easy to be associated with a filter, and in particular with the cover of the filter that normally is of limited size.

A further advantage of the selector valve according to the invention lies in that the safety valve can be easily assembled in the cursor, simply by realising the path, the shutter and the shutter seat.

Another advantage lies in that the path of the safety valve comes out in the main liquid passage of the cursor, and this allows this latter to be exploited as outlet passage of the liquid under superpressure, without having to realise other outlets.

A further advantage lies in that the cursor of a selector valve is exploited for housing an indicator dome of a superpressure thus obtaining a selector valve with a triple functionality.

Of course, a skilled person in the art can bring several modifications and variants to the above described selector valve in order to satisfy contingent and specific requirements, all within the scope of protection of the invention as defined by the following claims.

The invention claimed is:

1. Selector valve in a pressure filter for aquariums or ponds, comprising:
   a valve body (12) having a main liquid inlet opening (16), a secondary inlet opening (17), an outlet opening (18) and a discharge opening (19);
   a cursor (20) housed in the valve body (12), having a passage for the liquid (21) and being selectively moveable between a first position, corresponding to a filtration mode of the filter (11), wherein the main liquid inlet opening (16) is placed in fluid communication with the outlet opening (18), and a second position, corresponding to the washing mode of the filter (11), wherein the secondary inlet opening (17) is in fluid communication with the discharge opening (19); and
   a safety valve (36) included in the cursor (20) and fluidly communicating with a third inlet opening (38) for receiving liquid from the filter to protect the pressure filter (11) in case of superpressure of the liquid.

2. Selector valve according to claim 1, characterised in that the safety valve (36) comprises a liquid path (41) extended in the cursor (20) between an inlet mouth (38) and an outlet mouth (18), a shutter element (40) and a shutter seat (44) associated with the inlet mouth (38).

3. Selector valve according to claim 2, characterised in that the liquid path (41) comes out in the liquid passage (21).

4. Selector valve according to claim 2, characterised in that the inlet mouth (38) is formed in the valve body (12).

5. Selector valve according to claim 2, characterised in that the shutter seat (44) and the shutter element (40) are aligned along a central axis (Y) of the cursor (20).

6. Selector valve according to claim 5, characterised in that the shutter element (40) comprises a disc (42) and a rod (43) arranged along said central axis (Y) and having a first end integrally associated with the disc (42).

7. Selector valve according to claim 6, characterised in that the safety valve (36) comprises a spring (50) associated with the rod (43) to keep the disc (42) in the shutter seat (44) in shutting position.

8. Selector valve according to claim 6, characterised in that a second end of the rod (43) comprises a superpressure index (51).

9. Selector valve according to claim 8, characterised in that the index (51) is half-moon-like shaped.

10. Selector valve according to claim 5, characterised in that the cursor (20) can be angularly moved about the central axis (Y).

11. Selector valve according to claim 10, characterised in that the cursor (20) is associated with two disclike elements (22, 23), arranged perpendicularly to the central axis (Y).

12. Selector valve according to claim 5, characterised in that the liquid passage (21) is substantially upside-down L-like shaped, and comprises a first branch (30) having axis parallel to an axis (X), and a second branch (31) arranged parallel to the central axis (Y) in an eccentric position with respect to this latter.

13. Selector valve according to claim 12, characterised in that it comprises a pair of seats (33, 34) on opposite sides with respect to the first branch (30) of the passage (21) for housing corresponding sealing gaskets (35).

14. Selector valve according to claim 2, characterised in that said shutter seat (44) comprises a ring associated with the inlet mouth (38).

15. Selector valve according to claim 1, characterised in that it comprises a transparent dome (55) associated with the cursor (20).

16. Selector valve according to claim 10, characterised in that the dome (55) extends coaxially to the shutter (40) to receive the second end of the rod (43).

17. Selector valve according to claim 1, characterised in that the valve body (12) comprises two half-shells, each one comprising a half-seat (15*a*) and (15*b*) respectively, for housing the cursor (20).

18. Selector valve according to claim 15, characterised in that the main inlet opening (16), the outlet opening (18) and the discharge opening (19) are formed in a first of the two half-shells (12*a*) and in that the secondary inlet opening (17) is formed in the other of the two half-shells (12*b*).

19. Selector valve according to claim 18, characterized in that the main inlet opening (16), the outlet opening (18) and the discharge opening (19) have an axis on a same main plane and in that the main inlet opening (16) and the outlet opening (18) are aligned with each other along a determined axis (X), whereas the discharge opening (19) has an axis forming an angle with the axis of the main inlet opening (16) and of the outlet opening (18).

20. Selector valve according to claim 19, characterised in that the secondary inlet opening (17) has an axis arranged on a plane substantially perpendicular to the main plane.

21. Selector valve according to claim 1, characterised in that it comprises a control cover (25) for manoeuvring the movement of the cursor (20).

22. Filter for aquariums or ponds comprising a selector valve according to claim 1.

* * * * *